United States Patent
Enders et al.

(10) Patent No.: US 6,631,743 B2
(45) Date of Patent: Oct. 14, 2003

(54) FLEXIBLE CORD-LIKE HOLLOW OBJECT

(75) Inventors: Silvia Enders, Baden-Baden (DE); Holger Ullrich, Rastatt (DE); Thomas Fritz, Gernsbach (DE)

(73) Assignee: Aeroquip-Vickers International GmbH, Baden-Baden (DE)

( * ) Notice: Subject to any disclaimer, the term of this patent is extended or adjusted under 35 U.S.C. 154(b) by 0 days.

(21) Appl. No.: 10/252,638

(22) Filed: Sep. 23, 2002

(65) Prior Publication Data

US 2003/0019532 A1 Jan. 30, 2003

Related U.S. Application Data

(62) Division of application No. 09/700,271, filed as application No. PCT/EP99/05848 on Aug. 12, 1999, now Pat. No. 6,470,915.

(30) Foreign Application Priority Data

Aug. 13, 1998 (DE) ......................................... 198 37 498

(51) Int. Cl.$^7$ ................................................ F16L 11/04
(52) U.S. Cl. ...................... 138/138; 138/143; 428/36.91
(58) Field of Search .................................. 138/138, 127, 138/125, 143; 428/36.91; 427/69, 70

(56) References Cited

U.S. PATENT DOCUMENTS

| | | | |
|---|---|---|---|
| 801,494 A | 10/1905 | Wilhelmi | |
| 3,044,256 A | 7/1962 | Bayly et al. | |
| 3,706,326 A | 12/1972 | Bringolf | |
| 3,799,825 A | 3/1974 | Champleboux et al. | |
| 4,091,843 A | 5/1978 | Mikes et al. | |
| 4,257,459 A | 3/1981 | Jenks | |
| 4,351,364 A | 9/1982 | Cocks | |
| 4,383,554 A | 5/1983 | Merriman | |
| 4,385,645 A * | 5/1983 | Campbell et al. | ........... 138/139 |
| 4,559,095 A | 12/1985 | Babbin | |
| 4,842,024 A | 6/1989 | Palinchak | |
| 4,870,995 A | 10/1989 | Igarashi et al. | |
| 4,903,735 A | 2/1990 | Delacour et al. | |
| 4,905,735 A | 3/1990 | Akiyoshi | |
| 4,998,564 A | 3/1991 | Igarashi et al. | |
| 5,016,675 A | 5/1991 | Igarashi et al. | |
| 5,093,166 A | 3/1992 | Nishimura | |
| 5,145,628 A | 9/1992 | Karg et al. | |
| 5,264,262 A | 11/1993 | Igarashi | |
| 5,316,046 A | 5/1994 | Igarashi et al. | |
| 5,348,779 A | 9/1994 | Igarashi | |
| 5,380,385 A | 1/1995 | Derroire et al. | |
| 5,462,091 A | 10/1995 | Saupe | |
| 5,507,993 A | 4/1996 | Fortuin et al. | |
| 5,585,154 A * | 12/1996 | Rhoades | ................ 428/35.9 |
| 5,621,070 A | 4/1997 | Howard, Jr. | |

(List continued on next page.)

FOREIGN PATENT DOCUMENTS

| | | |
|---|---|---|
| DE | 4020798 | 1/1991 |
| DE | 19608318 A1 | 8/1997 |
| EP | 0 375 608 A1 | 12/1989 |
| EP | 0375608 A1 | 6/1990 |
| EP | 0384995 A | 9/1990 |

OTHER PUBLICATIONS

Schiefer, Kurt, Lexikon der Verfahrenstechnik, 1970, pp. 236–239.

*Primary Examiner*—James Hook
(74) *Attorney, Agent, or Firm*—Emch, Schaffer, Schaub & Porcello Co., L.P.A.

(57) ABSTRACT

A flexible cord-like hollow object for the transportation of media is provided with an inner zone enclosed by a casing. A barrier layer, which is impermeable to volatile molecules of the medium to be transported, is provided on the casing surface facing the inner zone. The barrier layer comprises sub-elements that are arranged in a scale-like manner.

12 Claims, 1 Drawing Sheet

U.S. PATENT DOCUMENTS

| | | | |
|---|---|---|---|
| 5,686,157 A | * 11/1997 | Harvey et al. | 428/36.7 |
| 5,718,956 A | * 2/1998 | Gladfelter et al. | 428/35.9 |
| 5,957,164 A | 9/1999 | Campbell | |
| 5,974,973 A | 11/1999 | Tittgemeyer | |
| 5,985,385 A | 11/1999 | Gottfried | |
| 6,029,712 A | 2/2000 | Dougherty | |
| 6,213,155 B1 | * 4/2001 | Furuta et al. | 138/123 |
| 6,213,156 B1 | * 4/2001 | Niki et al. | 138/126 |
| 6,237,641 B1 | * 5/2001 | Niki et al. | 138/126 |
| 6,328,075 B1 | * 12/2001 | Furuta et al. | 138/143 |
| 6,390,140 B2 | * 5/2002 | Niki et al. | 138/127 |
| 2001/0023714 A1 | * 9/2001 | Niki et al. | 138/126 |

* cited by examiner

FLEXIBLE CORD-LIKE HOLLOW OBJECT

This is a divisional of application Ser. No. 09/700,271, filed Nov. 10, 2000, now U.S. Pat. No. 6,470,915, which is a 371 of PCT/EP99/05848 filed Aug. 12, 1999.

TRANSLATION FROM GERMAN

International Appl. No. PCT/EP99/05848 filed Aug. 12, 1999 and German Patent Appl. No. 19837498.4 filed Aug. 13, 1998

The invention pertains to a flexible cord-like hollow object with an inner zone, which is enclosed by a casing, for the transportation of media.

Flexible cord-like hollow objects of this generic type are known. These cord-like hollow objects, which are also called tube(s) below, are used in many sectors of industry for the transportation of liquid or gaseous media. For use in technical climate control units, e.g. in motor vehicles, such tubes are used for the transportation of refrigerants. Refrigerants have the property that they are volatile and lead to harmful effects when they get into the earth's atmosphere. In order to avoid this, use should be made of natural refrigerants, e.g. $CO_2$. In the case of known refrigerant tubes, it is a disadvantage that these are not diffusion-proof and that they exhibit high permeability to natural refrigerants, especially carbon dioxide $CO_2$.

A tube for the transportation of gases is known from DE 40 20 798 A1, whereby this tube has an inner layer that has a low permeability to gases. In addition, a flexible tube for the transportation of media is known from EP 0 375 608 A1, whereby this tube has a barrier layer that is integrated into the casing and that comprises a metal foil, which is arranged to run length-wise or in a spiral shape, whereby the edges of the strip of metal foil overlap. A disadvantageous feature in this regard is that impairment of the impermeability to gases can occur, especially in the event of a high bending stress.

Thus the objective of the invention is to create a flexible cord-like hollow object of this generic type that has low permeability with simultaneously high flexibility, especially in the case of $CO_2$.

In accordance with the invention, this objective is accomplished by means of a flexible cord-like hollow object with the characterizing features that are designated in claim 1. As a result of the feature that the casing has a barrier layer on the casing surface that faces the inner zone, whereby the barrier layer comprises sub-elements that are arranged in a scale-like manner and whereby the barrier layer is impermeable to the volatile molecules of the medium that is to be transported, permeation through the flexible cord-like hollow object is prevented or at least reduced to a negligibly small value. Thus it becomes possible to transport refrigerants without the volatile components of the refrigerant being able to get into the atmosphere, especially when, as is preferred, the flexible cord-like hollow objects are used as a refrigerant tube. A low rate of permeation simultaneously ensures the reliable functioning of the refrigeration unit that is to be supplied with the refrigerant. The flexibility of the hollow object is not impaired, or it is impaired only insignificantly, by the scale-like arrangement of the sub-elements. The scale-like arrangement of the sub-elements leads to the situation in which the barrier layer does not break during stressing due to bending. Breakage or damage to the barrier layer would lead to an increase in the rate of permeation.

The scale-like construction can be achieved in a very advantageous manner by producing an appropriate crystal structure during the vapor deposition of the metallic barrier layer that is preferably provided.

The scale-like construction of the crystal structure can preferably be obtained via the vapor deposition of a crystalline substance on a layer of the casing that serves as a carrier layer, whereby the crystalline substance comprises e.g. metal or synthetic material. As a result, crystalline regions (platelets) are produced, which are absolutely impermeable, on the surface of the layer of the casing that serves as the carrier. As a result, the situation is reached in the non-expanded state, i.e. the non-stressed state, that the flexible cord-like hollow object (tube) is almost completely impermeable to the refrigerant that is to be transported. Negligibly low permeation can arise only through extremely small seams between the vapor deposited platelets. If the platelets are vapor deposited in such a way that they overlap, then a degree of overlapping of the platelets can be ensured, even during stressing due to bending or tensile stressing of the tube, so that e.g. 99% of the total surface is covered with the crystalline platelets even in such a state of the tube.

An advantageous feature, in particular, as a result of this is that use can be made of the flexible cord-like hollow objects, which have been provided with these crystalline platelets, even in the high pressure range and their low permeability remains intact. Such high pressure expansion tubes, which have been provided with the barrier layer in accordance with the invention, excel by virtue of their high flexibility, vibration attenuation and favorable effect on acoustics so that these advantages can be exploited along with the simultaneous assurance of low permeability.

In particular, use can be made of carbon dioxide $CO_2$ as the refrigerant in high pressure expansion tubes that have the barrier layer in accordance with the invention. The use of carbon dioxide as the refrigerant in the high pressure range leads, as such, to the problem of so-called decompressive explosion in the event of a sudden drop in pressure. The abrupt formation of large aggregates of the refrigerant occurs in a material that is in contact with the refrigerant. This would lead to damage or, as the case may be, to the destruction of the material. As a result of the barrier layer in accordance with the invention, the situation is now reached in which damage to the material, i.e. the casing of the flexible cord-like hollow object here, cannot occur since permeation into the casing of the molecules of carbon dioxide, which is used as the refrigerant, is prevented. Because of the aforementioned scale-like arrangement of the crystalline platelets, in particular, permeation is prevented or, as the case may be, reduced to a negligible minimum even in the case of high pressure expansion.

Moreover, it is preferable if the barrier layer comprises sub-elements that have been arranged in a scale-like manner, whereby these sub-elements preferably overlap in the direction of transportation of the medium and/or coaxially relative to the longitudinal axis of the hollow object. As a result, an especially flexible arrangement of the barrier layer is achieved that excels by virtue of particularly low permeability depending on the material that is selected [for its construction].

In a preferred form of embodiment of the invention, the feature is provided that the barrier layer comprises metal or synthetic material. As a result, a material can be selected in a simple manner that is in harmony with the refrigerant that is to be transported, whereby the material exhibits especially good barrier action with respect to the volatile components of the medium that is to be transported.

Moreover, the feature is provided in a further preferred form of embodiment of the invention that the barrier layer is connected to the outer casing surface of the inner layer of the casing in a non-positive manner [i.e. in an adherent manner that is force-actuated]. As a result, the situation is reached in which detachment of the barrier layer from the surface of the casing can be prevented during subsequent usage of the flexible cord-like hollow object in accordance with directions so that the low permeability, which has been achieved, is maintained. The feature is preferably provided that the casing surface is treated physically and/or chemically in order to increase the strength of adhesion between the barrier layer and the casing surface. As a result, roughening can be achieved, preferably and in particular, and this ensures better adherent bonding to the subsequently applied barrier layer.

In particular, it is preferred that an increase in the strength of adhesion between the barrier layer and the casing surface be obtained via polarization or activation of the material of the casing at least in the surface region of the casing surface. Depending on the material of the casing, which preferably comprises a polymer, polar groups can be incorporated, as a result, into the basic molecular structure of the casing, whereby these polar groups ensure an improvement in the coating of the casing surface with the barrier layer.

In a preferred form of embodiment of the invention, moreover, the feature is provided in which an additional bonding agent is arranged between the barrier layer and the casing surface. This additional bonding agent leads to an especially strong and durable non-positive [force-actuated, adherent] bond between the barrier layer and the casing so that the adherent bonding between the barrier layer and the casing remains intact even with relatively intense mechanical stressing during usage, which is in accordance with directions, and its low permeability can be maintained.

Further preferred forms of embodiment of the invention result from the remaining characterizing features that are designated in the subsidiary claims.

BRIEF DESCRIPTION OF DRAWINGS

The invention will be elucidated in more detail below in the examples of embodiments on the basis of the associated drawings. The following aspects are shown.

FIG. 1 shows a refrigerant tube 10 in the form of a cross section. The refrigerant tube 10 comprises a casing, which is designated in its entirety by 12, that encloses an inner zone 14. The casing 12 is formed from a flexible cord-like hollow object, whereby the surface 16 of the casing 12 forms the inner zone 14. The inner zone 14 is preferably constructed in the form of a cylinder with a circular cross section, whereby, in accordance with further examples of embodiments, this [inner zone] can also have a different shape, e.g. an oval or similar shape. The casing 12 is constructed in a multi-layer manner, whereby the casing surface 16 is formed by an inner layer 18. A middle layer 20 is arranged around the inner layer 18, whereby an outer layer 22 adjoins the middle layer. A reinforcing layer 24 is arranged between the middle layer 20 and the outer layer 22. The layers 18, 20 and 22 of the casing 12 comprise a polymeric material, for example. The reinforcing layer 24 comprises a flexible fabric-reinforced layer, for example.

Figure 1:
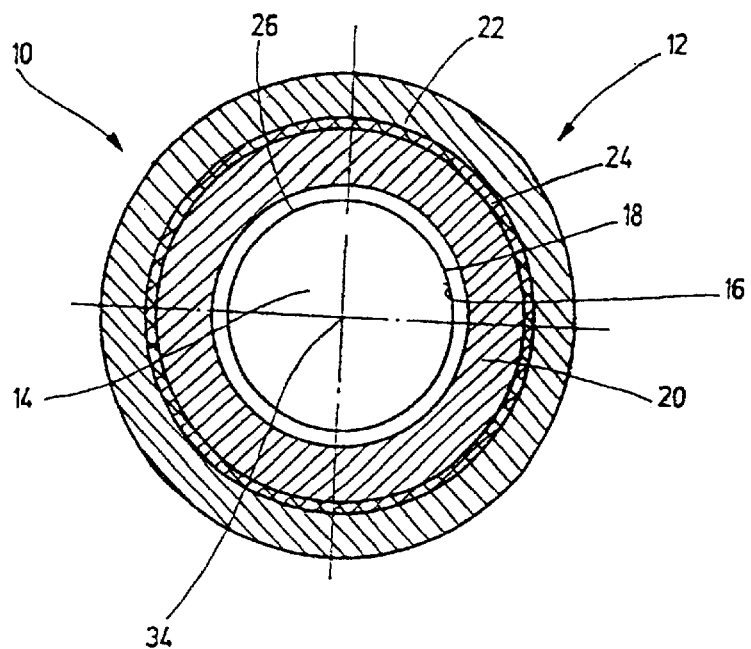
FIG. 1 shows a cross section through a refrigerant tube.

A barrier layer 26 is installed on the casing surface 16. The barrier layer 26 is connected over its entire surface in a non-positive [adherent, force-actuated] manner to the casing surface 16. For example, the barrier layer 26 can be installed in the inner zone 14 after the layer assembly of the casing 12 has taken place. In accordance with a further example of an embodiment, the barrier layer 26 can first be installed on the casing surface 16 of the inner layer 18, while the further layers 20, 22 and 24 are installed subsequently, e.g. by extrusion. Finally, it is conceivable that the individual layers of the casing 12 be installed subsequently on the barrier layer 26.

The barrier layer 26 comprises metal or synthetic material, for example. The material of the barrier layer 26 is harmonized with respect to the refrigerant that is to be transported through the inner zone 14 of the refrigerant tube 10. Consideration can be given to e.g. carbon dioxide $CO_2$ as the refrigerant.

The casing surface 16 can be roughened in order to achieve a high strength of adhesion between the barrier layer 26 and the inner layer 18. This can take place e.g. physically, via the mechanical action of a suitable device, or chemically via alkalis, acids or similar substances. Adherent bonding to the barrier layer 26 is improved as a result of the roughness that is hereby achieved. In accordance with a further example of an embodiment, a bonding agent can be introduced between the barrier layer 26 and the casing surface 16. The casing surface 16 can also be polarized or activated in order to increase the strength of adhesion.

Figure 2:
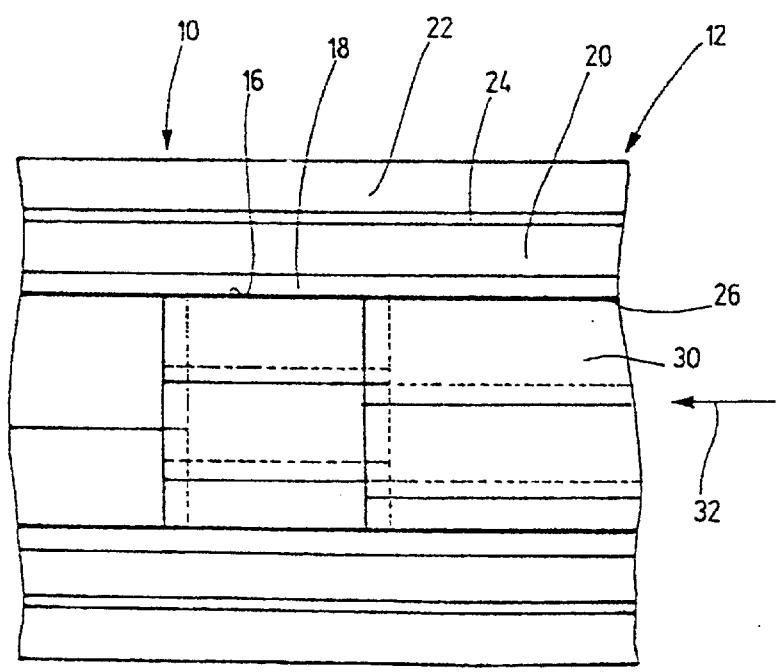
FIG. 2 shows a longitudinal section though a segment of a refrigerant tube.

FIG. 2 shows a schematic longitudinal section through the refrigerant tube 10. The parts that are identical to those in FIG. 1 are provided with identical reference numbers and are not elucidated a second time. A further variant of an embodiment will be illustrated by means of the longitudinal section, whereby the barrier layer 26 comprises individual sub-elements 30 that lie adjacent to the casing surface 16 in a scale-like manner. The casing surface 16 can, in turn, be mechanically and/or chemically roughened as in the case of the example of the embodiment that has already been discussed in connection with FIG. 1. Moreover, an additional bonding agent can be provided. FIG. 2 indicates, by means of the arrow 32, the hypothetical direction of transportation of a refrigerant through the inner zone 14. The scale-like arrangement of the sub-elements 30 of the barrier layer 26 can take place in such a way that these overlap both in the transportation direction 32 and also coaxially relative to the central axis 34 (FIG. 1). As a result of the scale-like arrangement of the barrier layer 26, the flexibility of the refrigerant tube 10 is modified only insignificantly by the introduction of the barrier layer 26. The sub-elements 30, which are arranged in a scale-like manner, can follow [accommodate], with no problem, stress due to the bending of the casing 12. The bending of the casing 12 can be followed [accommodated] in all spatial directions by the barrier layer 26 as a result of the overlapping [of the sub-elements] in the transportation direction 32 and/or in the coaxial direction relative to the longitudinal axis 34.

In an overall way, it will be clear that a refrigerant can be transported as a result of the installation of the barrier layer 26 on the surface 16 of the casing 12, whereby this surface delineates the inner zone 14 and whereby the volatile components of the refrigerant are unable to diffuse through the casing 12. Because of the barrier layer 26, this [casing] attains extremely low permeability to the molecules of the refrigerant that is to be transported. On the other hand, the diffusion of molecules in the opposite direction and hence into the inner zone 14 is also prevented by the barrier layer 26.

What is claimed is:

1. A flexible cord-like hollow object comprising a casing (12) extending along a longitudinal axis and having (1) an inner layer (18) with an inner surface (16) encircling an inner zone for the transportation of a medium having volatile molecules and (2) a barrier layer (26), which is impermeable to said volatile molecules of the medium that is to be transported, characterized by the feature that said barrier layer (26) (i) is on said inner surface (16), (ii) comprises sub-elements (30) that are arranged in a scale-like manner and overlap in both the transportation direction of the medium and coaxially relative to said longitudinal axis and (iii) is a metal or synthetic material affixed to said inner surface by vapor deposition.

2. A method for preventing excessive permeation of fluid flowing through an inner zone (14) or passageway of a flexible hollow object (10), said inner zone extending along an axis, said hollow object having an inner layer (18) with an inner surface (16) and an outer layer (22) comprising the steps of
   (a) positioning a barrier layer (26) on said inner surface (16) by vapor deposition, said barrier layer (26) having sub-elements (30);
   (b) causing said sub-elements (30) to be positioned in overlapping relationship relative to adjacent sub-elements and to overlap co-axially relative to said axis; and
   (c) directing the flow of said fluid through said inner zone (14) in the direction of overlapping.

3. The method according to claim 2 further including the step of treating said inner surface (16) physically and/or chemically in order to increase the strength of adhesion of the barrier layer (26).

4. The method according to claim 2 further including the step of roughening said inner surface (16) in order to increase the strength of adhesion of the barrier layer (26).

5. The method according to claim 2 further including the step of polarizing said inner surface (16) in order to increase the strength of adhesion of the barrier layer (26).

6. A flexible cord-like hollow object comprising a casing (12) extending along a longitudinal axis and having (1) an inner layer (18) with an inner surface (16) encircling an inner zone for the transportation of a medium having volatile molecules and (2) a barrier layer (26), which is impermeable to said volatile molecules of the medium that is to be transported, characterized by the feature that said barrier layer (26) is on said inner surface (16) and comprises sub-elements (30) that are arranged in a scale-like manner and overlap in both the transportation direction of the medium and coaxially relative to said longitudinal axis and further characterized by the feature that said barrier layer (26) is a metal or synthetic material affixed to said inner surface by vapor deposition.

7. A flexible cord-like hollow object according to claim 6 wherein said inner surface is treated physically and/or chemically in order to increase the strength of adhesion of the barrier layer (26).

8. A flexible cord-like hollow object comprising a casing (12) extending along a longitudinal axis and having (1) an inner layer (18) with an inner surface (16) encircling an inner zone for the transportation of a medium having volatile molecules and (2) a barrier layer (26), which is impermeable to said volatile molecules of the medium that is to be transported, characterized by the feature that said barrier layer (26) is on said inner surface (16) and comprises sub-elements (30) that are arranged in a scale-like manner and overlap in both the transportation direction of the medium and coaxially relative to said longitudinal axis and characterized further by the feature that barrier layer is a metal or synthetic material affixed to said inner surface by vapor deposition.

9. A flexible cord-like hollow object according to claim 8 wherein said inner surface (16) is roughened.

10. A flexible cord-like hollow object according to claim 8 wherein said inner layer (18) is polarized at least in the region of said inner surface (16).

11. A flexible cord-like hollow object according to claim 8 wherein at least one of said inner layer (18), middle layer (20) or outer layer (22) is a polymeric material.

12. A flexible cord-like hollow object according to claim 8 wherein a reinforcing layer (24) is arranged between said outer layer (22) and said middle layer (20) or between said middle layer (20) and said inner layer (18).

* * * * *